United States Patent [19]

Johnson et al.

[11] 4,135,341

[45] Jan. 23, 1979

[54] ROLL-ON CEILING FOR MANUFACTURED HOMES

[75] Inventors: Norman A. Johnson, Lititz; Raymond C. Kent, Lancaster, both of Pa.

[73] Assignee: Armstrong Cork Company, Lancaster, Pa.

[21] Appl. No.: 807,839

[22] Filed: Jun. 20, 1977

[51] Int. Cl.² .......................... B32B 3/00; B32B 5/06; E04C 2/02; E04H 1/12

[52] U.S. Cl. ................................. 52/316; 52/309.1; 52/424; 52/483; 52/506; 52/746; 428/141; 428/161; 428/234

[58] Field of Search ............... 52/479, 460, 471, 656, 52/262, 745, 316, 309.1, 483, 506, 746, 424; 162/116, 155; 428/161, 141, 234, 300; 29/469; 156/148, 209, 220

[56] References Cited

U.S. PATENT DOCUMENTS

| | | | |
|---|---|---|---|
| 1,709,028 | 4/1929 | Lathrop | 52/479 |
| 1,815,922 | 7/1931 | Lapof | 52/479 |
| 2,015,817 | 10/1935 | Schmidt | 52/479 |
| 2,126,956 | 8/1938 | Gilbert | 52/424 |
| 2,307,978 | 1/1943 | Williams | 52/506 X |
| 2,396,828 | 3/1946 | Carpenter | 52/92 |
| 2,587,985 | 3/1952 | Elmendorf | 52/479 X |
| 2,634,494 | 4/1953 | Powers | 29/469 |
| 2,669,757 | 2/1954 | Lenk, Jr. | 52/506 |
| 2,717,538 | 9/1955 | Alexander | 162/116 |
| 2,759,813 | 8/1956 | Feigley, Jr. | 162/155 |
| 2,779,979 | 2/1957 | Sundelin et al. | 52/479 |
| 3,545,154 | 12/1970 | Bobzin et al. | 52/471 X |
| 3,555,763 | 1/1971 | Bloxom | 52/745 |
| 3,745,734 | 7/1973 | Davey et al. | 52/471 X |
| 4,007,071 | 2/1977 | Addie et al. | 428/161 X |

FOREIGN PATENT DOCUMENTS

| | | | |
|---|---|---|---|
| 827109 | 1952 | Fed. Rep. of Germany | 52/479 |
| 381644 | 10/1932 | United Kingdom | 52/745 |

Primary Examiner—Alfred C. Perham

[57] ABSTRACT

There is provided a roll-on type ceiling material that has a monolithic appearance free from batten strips, rosettes, or plastic inserts. A base surface is applied and this is covered by a flexible, decorative sheet to form the ceiling covering.

1 Claim, 1 Drawing Figure

U.S. Patent      Jan. 23, 1979      4,135,341
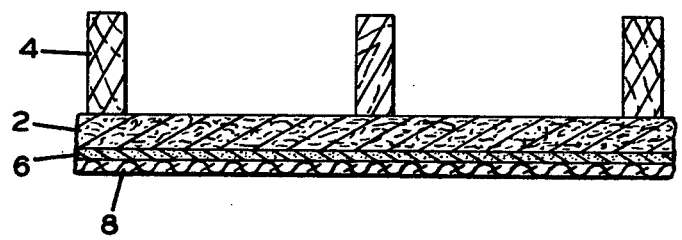

ROLL-ON CEILING FOR MANUFACTURED HOMES

BACKGROUND OF THE INVENTION

1. Field of the Invention

The invention is directed to a ceiling, and more particularly, to a specialized ceiling for a manufactured home.

2. Description of the Prior Art

U.S. Pat. Nos. 3,545,154 and 3,745,734 are directed to typical ceiling structures for manufactured homes. The ceilings are formed from rigid ceiling boards which are held in place by staples, nails, rosettes, or batten strips. Rosettes or batten strips or plastic cover strips are visual in the finished product. The above two patents show the utilization of concealing strips which attempt to conceal the means fastening the ceiling boards in position.

SUMMARY OF THE INVENTION

The invention is directed primarily to a method for fabricating a ceiling of a manufactured home. The first step in the manufacturing of the ceiling consists of the forming of a support framework for the ceiling and roof structure of the manufactured home with the ceiling portion facing upward and the roof portion facing downward. In effect, the ceiling is formed in a jig or on a floor upside down. Over the support framework there are positioned backer-board means to form a base for the ceiling. Covering the backer-board means will be a one piece construction flexible sheet, having a decorative surface facing upward and the opposite surface thereof being fastened to the backer-board means. This assembly is then rotated 180° to position the decorative surface of the flexible sheet so that it faces downward. The assembly is then mounted upon the walls of a manufactured home.

BRIEF DESCRIPTION OF THE DRAWING

The FIGURE of the drawing is a cross-sectional view of a roll-on ceiling construction for a manufactured home.

DESCRIPTION OF THE PREFERRED EMBODIMENT

Manufactured homes, which are also known as mobile homes, are manufactured in a manner quite different from conventional homes. A floor support structure is mounted upon a trailer carriage. Floor covering material is then rolled out across this base and stapled or adhesively affixed in position. At the same time, the ceiling framework is prefabricated upside down. Support framework is prefabricated and fastened to this will be conventional ceiling boards, such as that disclosed in U.S. Pat. No. 2,717,538. These ceiling boards may be simply held in place by rosettes and nails passing through the ceiling board to the support framework. Batten strips and nails could be used in lieu of the rosettes. U.S. Pat. Nos. 3,545,154 and 3,745,734 show alternative methods for fastening these decorative ceiling boards to the ceiling of a manufactured home. The ceiling assembly is now turned over 180° and lifted above the floor assembly. Wall units are fabricated in jigs and are then positioned between the ceiling and the floor assemblies. The different assemblies are then fastened together to form the manufactured home. In all cases, the finished ceiling gives the appearance of being formed from the modular units. In a normal home, a ceiling is provided with a monolithic appearance in that it appears to be one smooth continuous surface, whether or not it is plaster covered with paint or wallpaper.

The invention herein relates to a roll-on type ceiling material that has a monolithic appearance free from batten strips, rosettes, or plastic inserts. The new ceiling concept is made of two parts. One being the decorative surface while the other is a backer-board which can be an unfinished fiberboard, such as that now used as the decorative surface of the finished ceiling. The fiberboard such as that disclosed in U.S. Pat. No. 2,717,538 would be used as a backer-board except that there would be no need now to finish the board and provide it with a decorative surface. It would simply now be a relatively smooth surface board structure. This backer-board structure 2 would then be nailed or stapled to the support framework 4 of the ceiling assembly through the use of nails or staples. The support framework 4 would be assembled on the floor of the manufacturing facility or in a specialized jig. Basically, the support framework is framing lumber which is used to form the rafter structure of the roof. On one side of this framework would be placed the roof and on the other side is placed the decorative surface forming the ceiling of the finished manufactured home. On the backer-board, there may be adhered a Mylar coating to form a vapor barrier. It is also possible to use a conventional latex adhesive, and this alone would form a vapor barrier. The latex adhesive 6 would then be used to fasten in position the roll-on ceiling structure 8. This roll-on ceiling structure forms the decorative surface of the ceiling. The roll-on surface is a thin (approximately 1/16" to ⅛" thick) sheet product similar to that disclosed in U.S. Pat. No. 2,759,813. This sheet material is flexible and would be provided on one surface thereof with a decorative paint coating. It could also be shallow embossed to provide it with a combination colored and embossed pattern. The sheet material would be made in the same width as the width of the manufactured home. It would be made of an indeterminant length so that the sheet material can be cut off a roll to the length of the manufactured home ceiling. In addition to being made from asbestos fiber structure, the product could be made from wood fiber. In addition, the roll-on ceiling structure could be a very heavy grade of paper. The roll-on flexible ceiling material 8 is then adhesively fastened to the backer-board structure 2. As indicated above, the vapor barrier could be the adhesive layer 6 or a Mylar layer could be adhered to the back of the roll-on ceiling sheet 8. After the ceiling assembly has been prefabricated on the floor with the finished ceiling now facing upward, the combination assembled framework, backer-board means, and ceiling sheet assembly is rotated 180° and lifted above the prefabricated floor structure of the manufactured home. Conventional finishing operations are now carried out to completely assemble the manufactured home.

Finally, it is possible that the backer-board could be covered with a non-woven, felted material. A typical fabric material that could be utilized is that shown in U.S. Pat. No. 4,007,071. A particularly good structure to utilize is an 8 oz. per sq. yd. construction having a modacrylic face with a polyester back web. The modacrylic fibers are used in the face web so that the fabric can be embossed at a moderate temperature without further treatment. The polyester is used as a back web because it is lower in cost than the modacrylic. The two webs are needle-bonded to a conventional polypropylene scrim which is stable at moderate temperatures and is available in 14' widths. The fabric is completed by applying a 3.5 oz. per sq. yd. latex back coat to the two webs needle-bonded to the scrim or support layer. Such a material can be continuously embossed by a rolling process at temperatures ranging from 275° to 350° F. Such a product can then be adhesively bonded to the backer-boards to form the finished ceiling of a manufactured home. The embossed surface effect gives a pleasing design and helps conceal irregularities of the backer-board means.

What is claimed is:

1. A ceiling for a manufactured home consisting of:
    (a) a support framework,
    (b) backer-board means on the support framework to provide the base of the ceiling, and
    (c) a one-piece construction flexible sheet having a decorative surface fastened to said backer-board means and covering the complete ceiling of the manufactured home,
        (1) said flexible sheet consisting of a scrim
        (2) positioned thereon and needle-bonded thereto are two webs of different fiber materials, the outer web being a material which will heat emboss better than the underlying web, and
        (3) said outer web at least being embossed and forming said decorative surface.